INVENTOR
Allen C. Harriman

BY Albert Gordon
ATTORNEY

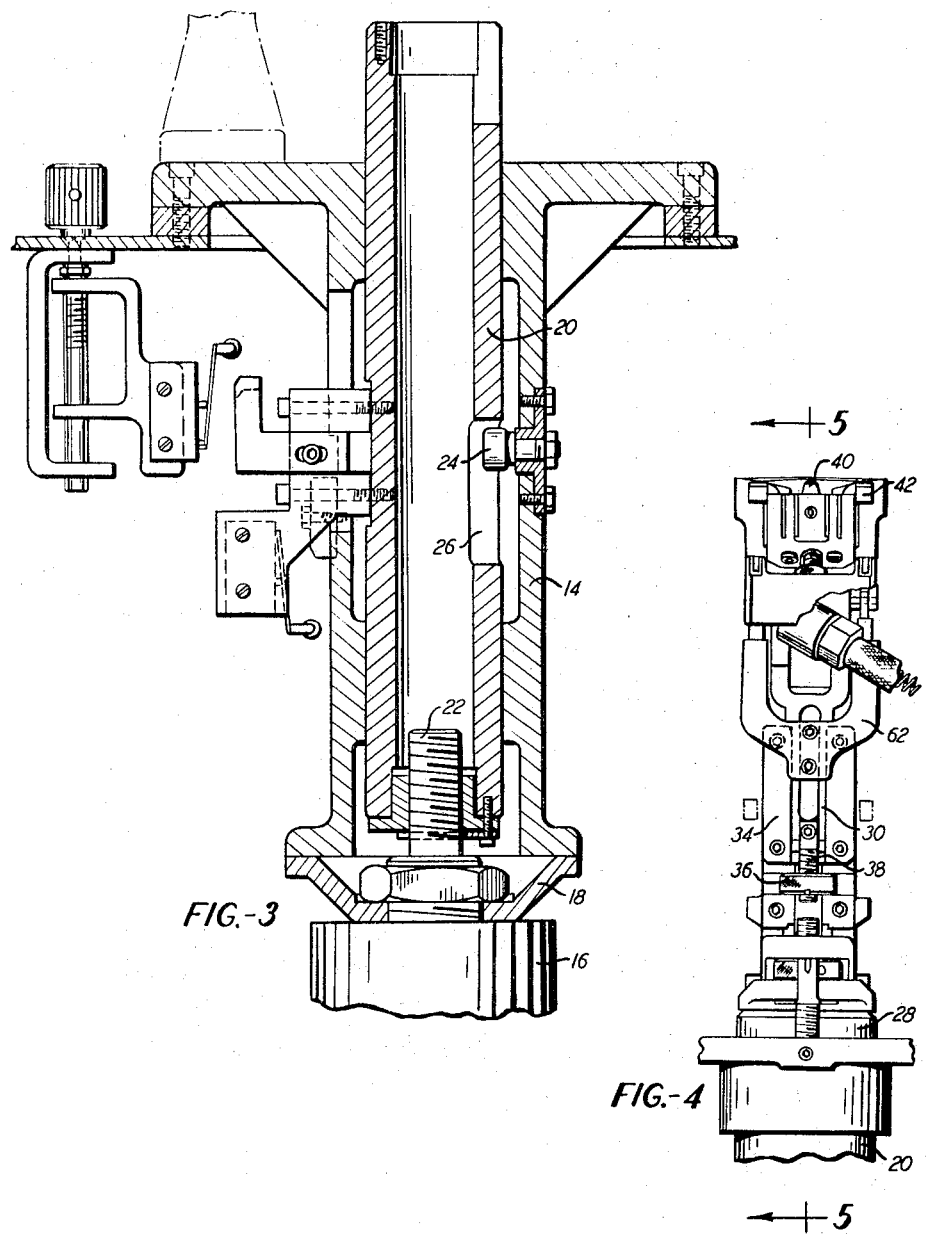

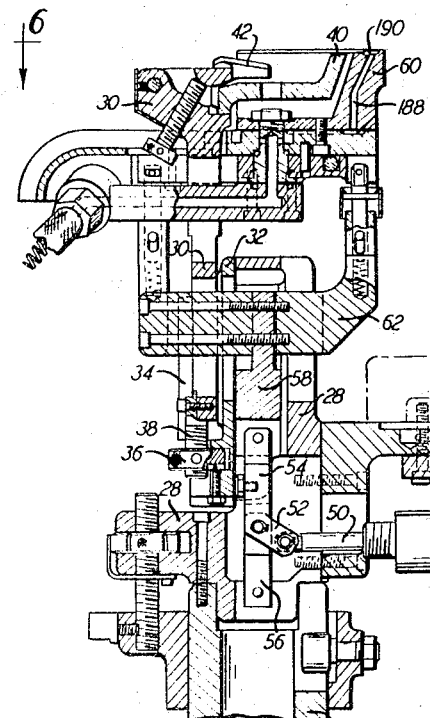

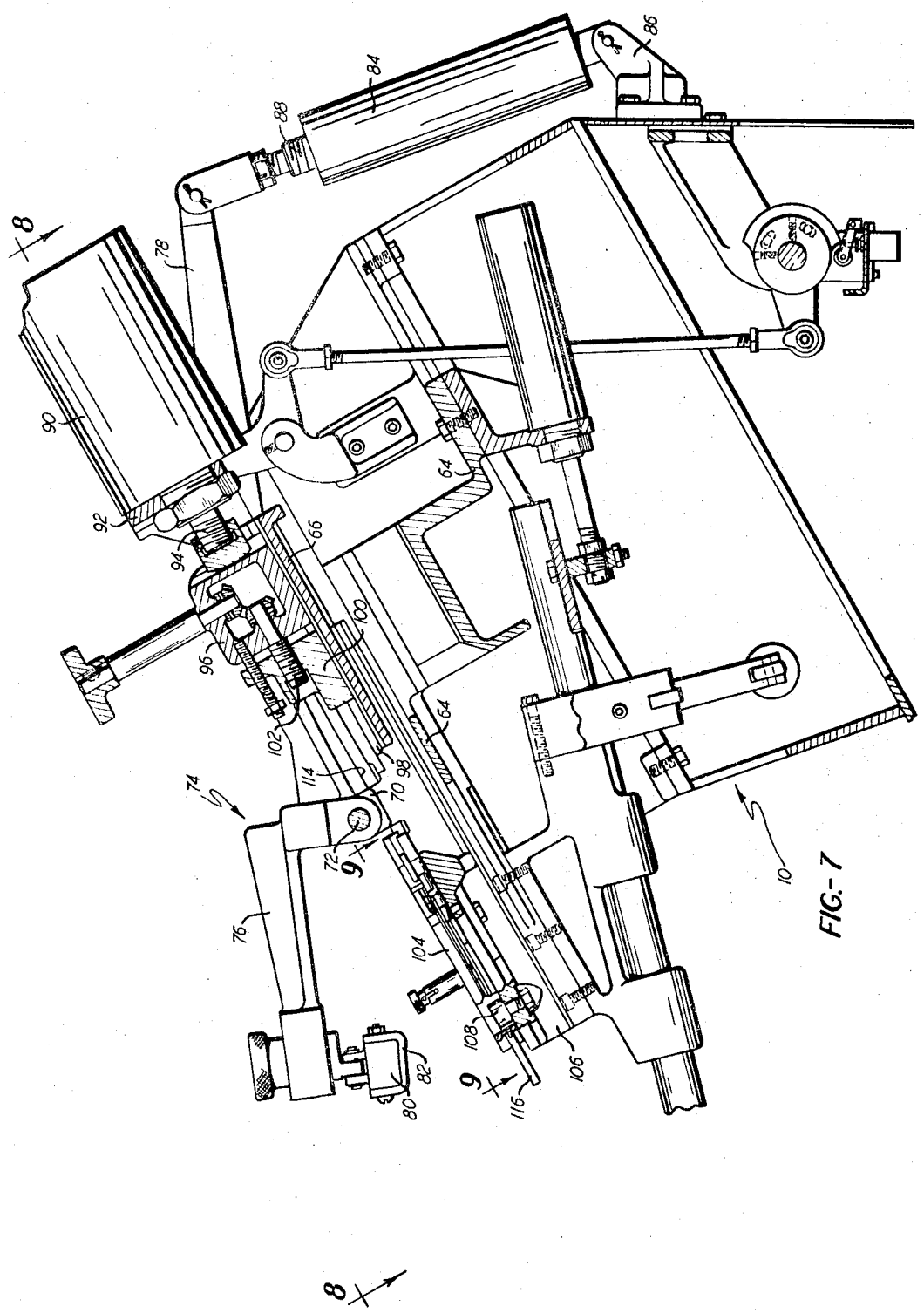

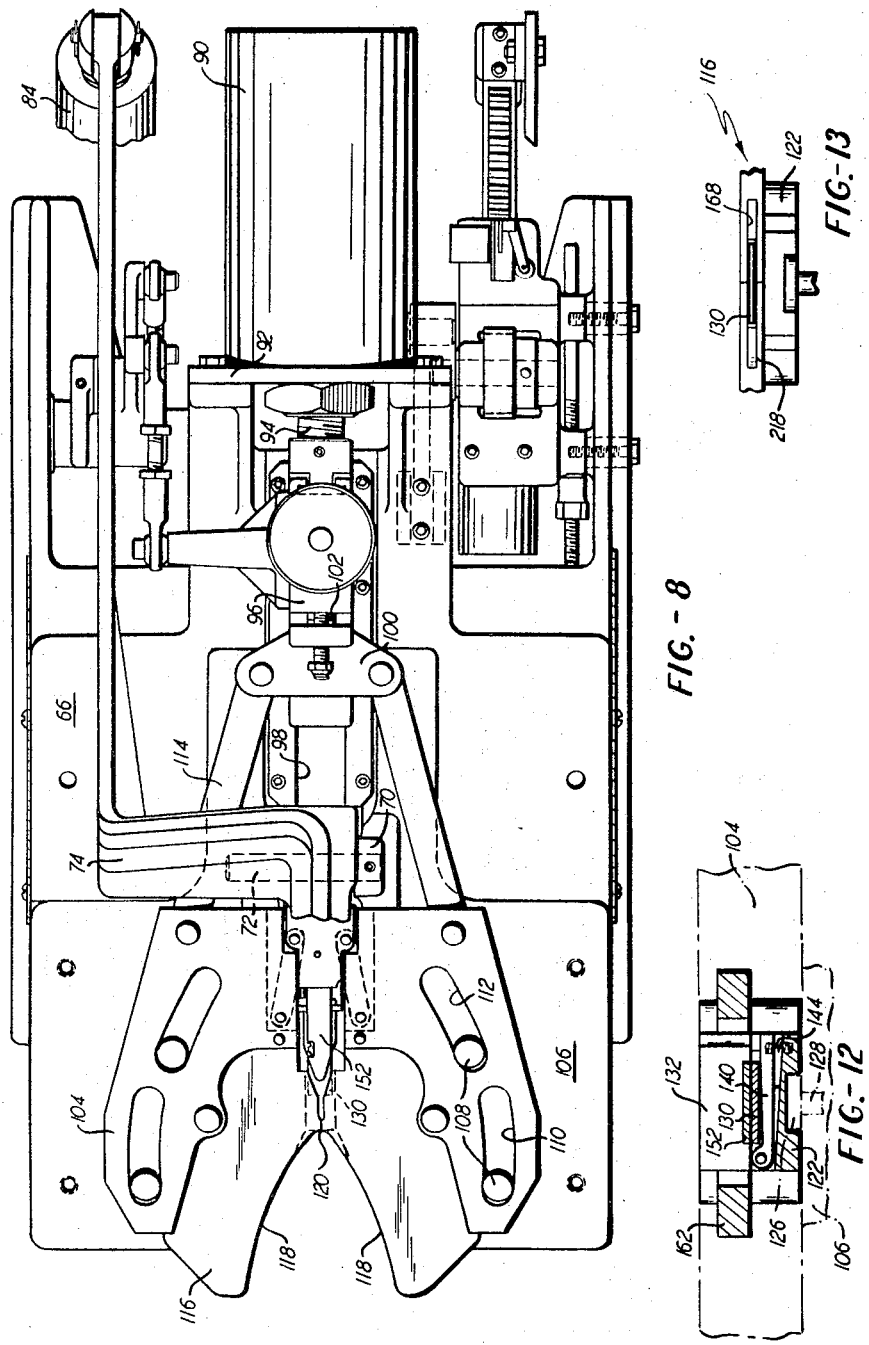

United States Patent Office 3,343,191
Patented Sept. 26, 1967

3,343,191
LASTING MACHINE HAVING BEDDING TOOL
Allen C. Harriman, Brockton, Mass., assignor to
Jacob S. Kamborian, Boston, Mass.
Filed Feb. 21, 1966, Ser. No. 528,749
11 Claims. (Cl. 12—7.1)

In the lasting of shoes, it is known practice to support a shoe assembly that comprises a last having an insole located on its bottom and an upper mounted thereon and to wipe a selected portion of the margin of the upper against the corresponding portion of the insole by means of wipers having front side surfaces that diverge forwardly from a vertex and back side surfaces that extend rearwardly of the vertex. The wipers are caused to move from a retracted position through a wiping stroke to an advanced position. During the wiping stroke the wipers move forwardly and also swing inwardly about the vertex to cause the front side surfaces to wipe the upper margin portion against the insole while the back side surfaces separate to leave a gap therebetween that exposes a segment of the wiped margin portion. It is also known practice to provide a bedding tool that moves forwardly into this gap and to apply bedding pressure so that the wipers and bedding tool have relative movement toward the wiped margin portions to iron the wiped margin portions against the insole and to cause them to be bonded to the insole by means of cement that had previously been introduced between the margin portion and the insole.

The present invention is concerned with an improved arrangement for enabling this operation to take place. Wiping units, that include the wipers, are movably mounted on a block. A bedding unit, that includes the bedding tool, is also movably mounted on the block. In the retracted position of the wipers the bedding tool is located rearwardly of the back side surfaces of the wipers and during the wiping stroke the bedding tool is caused to move forwardly into the gap formed between the back side surfaces of the wipers at a greater rate than the rate of forward movement of the wipers. When the bedding pressure is applied against the wipers and the bedding tool, it is borne by the block which is strong enough to sustain this pressure without damaging or deflecting the wipers or bedding tool.

The bedding unit may include a knife that is located below the bedding tool and that has a cutting edge that is forward of the bedding tool. The knife is movable in slots that are formed in the wipers and is projected forwardly of the front side surfaces of the wipers during the wiping stroke to cut into the upper material gathered by the wipers during the wiping stroke. Since there is clearance between the bottom of the knife and the bottoms of the slots, the bedding pressure is still borne by the block and is not borne by any part of the wipers.

In the drawings:

FIGURE 3 is a vertical section of a portion of the machine including a toe post on which a support for the shoe assembly is mounted;

FIGURE 4 is a front elevation of a portion of the machine showing the arrangement for supporting the shoe assembly;

FIGURE 5 is a section taken on the line 5—5 of FIGURE 4;

FIGURE 6 is a plan view taken on the line 6—6 of FIGURE 5;

FIGURE 7 is a side elevation, partially in section, showing the wiper operating mechanism;

FIGURE 8 is a plan view taken on the line 8—8 of FIGURE 7;

FIGURE 12 is a section taken on the line 12—12 of FIGURE 9;

FIGURE 13 is a view taken on the line 13—13 of FIGURE 9;

FIGURE 14 is a representation of the shoe assembly as it appears in the machine just before the wiping stroke;

FIGURE 14A is a view taken on the line 14A—14A of FIGURE 14;

Figure 1:
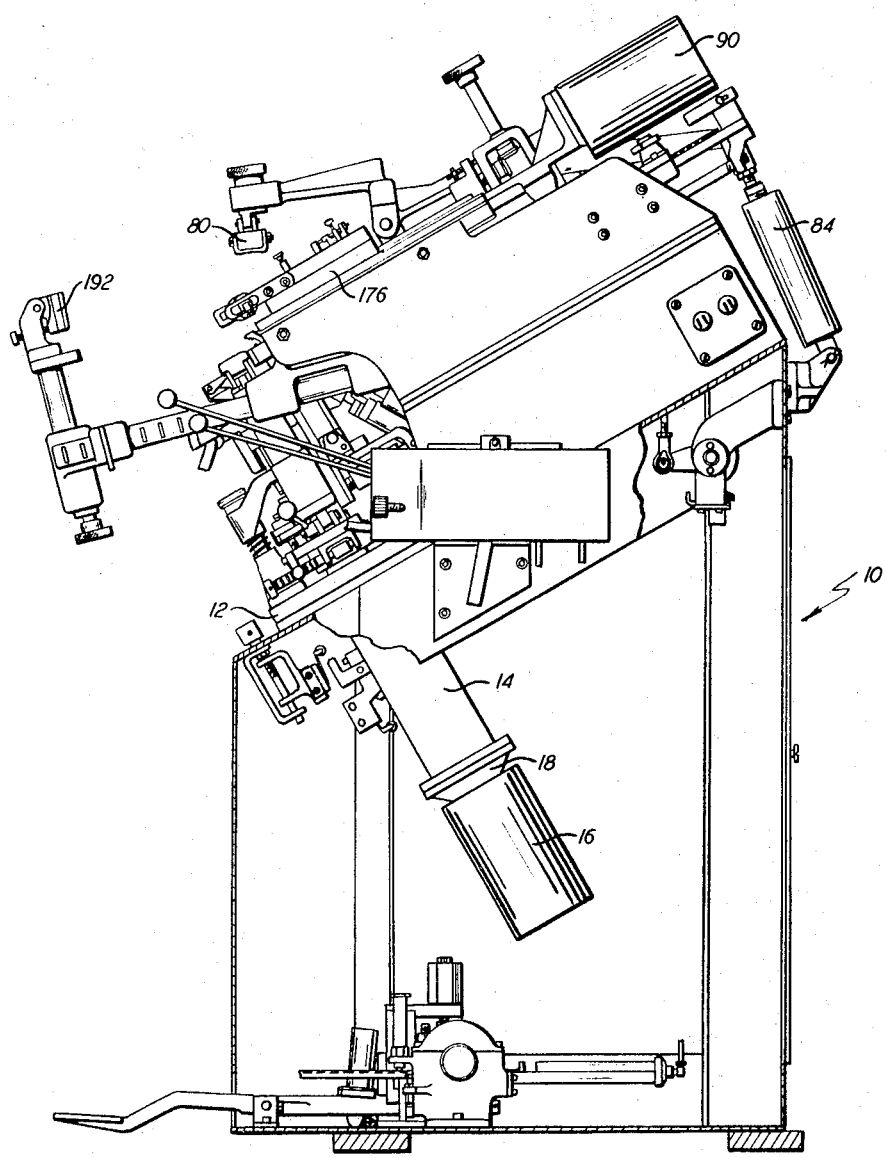
FIGURE 1 is a side elevation of a machine that incorporates the invention.

The machine disclosed in application Serial Number 472,525 filed July 16, 1965 has been modified to incorporate the present invention. Referring to FIGURE 1, the machine includes a frame 10 that incorporates a base plate 12 that has a sleeve 14 extending downwardly therefrom. For convenience of operation, the machine is inclined about 30 degrees from the horizontal. However, parts extending in the direction of the plate 12 will hereafter be referred to as extending horizontally and parts extending in the direction of the sleeve 14 will hereafter be referred to as extending vertically. The operator is intended to be located to the left of the machine as seen in FIGURE 1, and a direction extending toward the operator (right to left in FIGURE 1) will be referred to as "forward" while a direction extending away from the operator (left to right in FIGURE 1) will be referred to as "rearward."

An air operated motor 16 is secured to a cap 18 at the bottom of the sleeve 14 (FIGURE 3), and a toe post 20 is secured to the piston rod 22 of the motor 16 to extend vertically and be slidable within the sleeve 14. A roller 24, bolted to the sleeve 14, is received in a vertical slot 26 in the post 20 to preclude rotation of the post about the axis of the sleeve.

A toe post extension 28 (FIGURES 4 and 5) is secured to the upper end of the post 20. A bar 30, which serves as an insole rest mount, is slidably mounted for vertical movement between a bearing plate 32 and gibs 34 that are secured to the post extension 28. A nut 36, rotatably mounted in the post extension 28, is in threaded engagement with a screw 38 that is fastened to the bar 30. A toe insole rest 40 and a pair of forepart insole rests 42 are mounted to the bar 30 with the forepart rests 42 located forwardly of and on opposite sides of the toe insole rest 40. A rearwardly extending ledge 44 of the post extension 28 has a hanger 46 depending therefrom. An air operated motor 48 is pivoted to the hanger 46. The piston rod 50 of the motor 48 is pivoted to a link 52, and the link 52 is pivoted to a pair of toggle links 54 and 56. The link 56 extends downwardly of the link 52 and is pivoted to the post extension 28 while the link 54 extends upwardly of the link 52 and is pivoted to a slide 58 that is guided for vertical sliding movement by the post extension 28 and the bearing plate 32. An applicator-support 60 is mounted to a mount 62 that is secured to the slide 58. The applicator-support 60 lies outwardly and rearwardly of the insole rests 40, 42 and has a configuration corresponding to the periphery of the toe portion of the insole of the shoe to be lasted.

Figure 2:
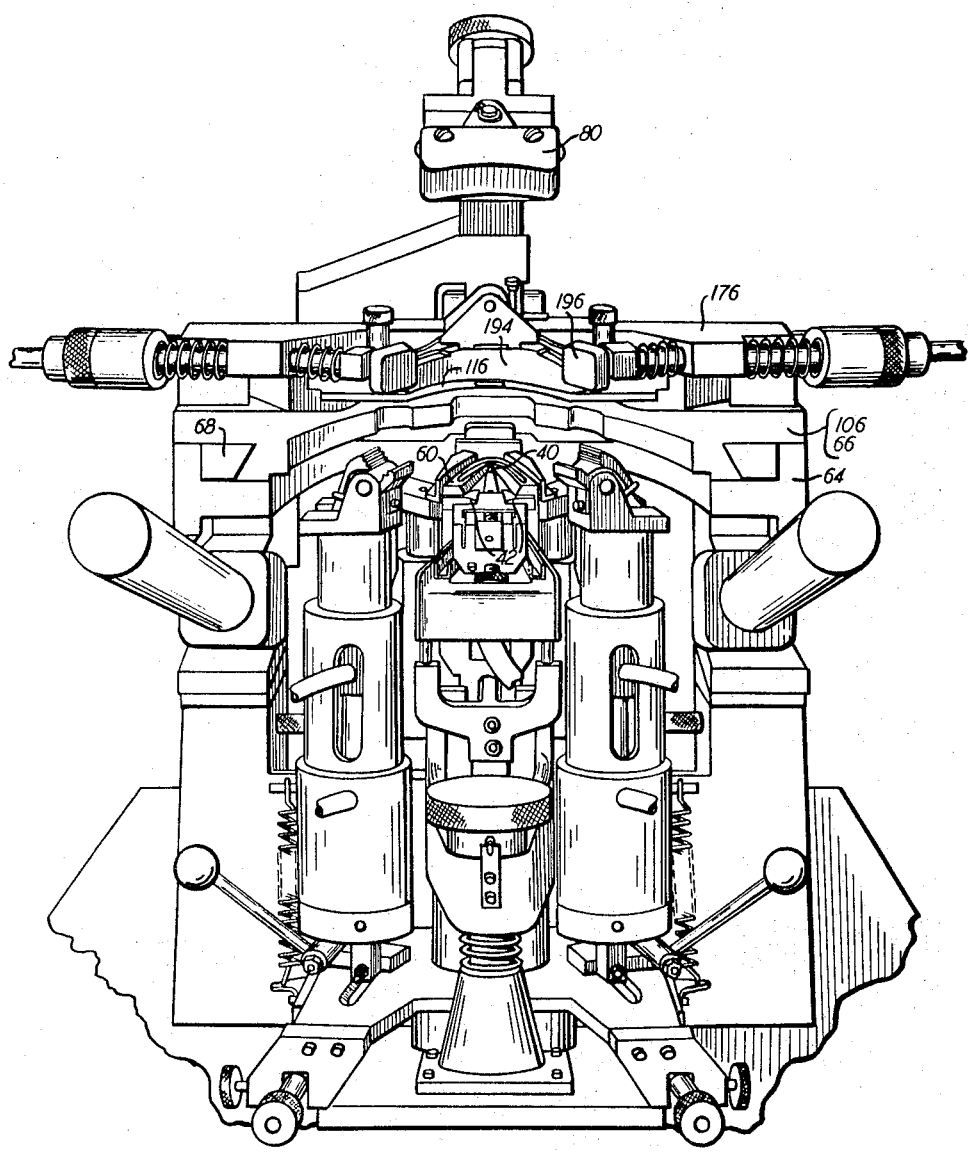
FIGURE 2 is a front elevation of the upper portion of the machine.

Referring to FIGURES 7 and 8, the frame 10 includes a head 64 located rearwardly of the aforementioned parts. A slide plate 66 is slidably mounted for forward and rearward movement in the head 64 on gibs 68 (FIGURE 2). Trunnions 70 upstanding from the slide plate 66 mount a pin 72 on which is swingably mounted a hold-down lever 74. The lever 74 has a front leg 76 extending forwardly of the pin 72 and a rear leg 78 extending rearwardly of the pin 72. A toe hold-down 80, having a flexible hold-down pad 82 thereon, is secured to the front end of the lever leg 76. An air actuated motor 84, pivoted to a bracket 86 secured to the frame 10, has a piston rod 88 that is pivoted to the rear end of the lever leg 78.

An air actuated motor 90 is fastened to a flange 92 secured to the rear of the slide plate 66. The piston rod 94 of the motor 90 is connected to a housing 96 that is slidably mounted in gibs 98 formed in the slide plate 66. A block 100 is slidably mounted in the gibs 98 forwardly of the housing 96 and is connected to the housing by a bolt 102. A pair of symmetrically disposed wiper cams 104 are slidably supported on a thickened block 106 that forms the forward end of the slide plate 66. The block 106 has pins 108 upstanding therefrom that extend into slots or cam tracks 110 and 112 formed in the wiper cams 104. Forwardly diverging links 114 are pivotally connected at their rear ends to the block 100 and at their forward ends to the wiper cams 104. Wipers 116 are connected to and extend forwardly of the wiper cams 104. The wipers, as is conventional, are flat plates having forwardly divergent front side surfaces 118 tht diverge from a vertex 120 (see FIGURE 9). The wiper cams 104 and the wipers 116 constitute wiping units.

Referring to FIGURES 9-13, the contiguous faces of the wiper cams are spaced to accommodate a bracket 122 that rests on the block 106. A longitudinally extending slot 124 is provided in the bracket 122 that slidably receives a follower ring 126. The ring 126 is mounted on a pin 128 that extends upwardly of the block 106. A knife 130 is received between an upper surface 131 of the bracket 122 and a cap 132 that overlies the bracket 122 and is mounted on pins 134 that are upstanding from the bracket 122. The knife has a sharpened edge 136 at its forward end and a plurality of ratchet teeth 138 at one of its sides that are engageable by a pawl 140. The pawl is pivotally mounted by way of links 143 to a pin 142 that is mounted to the bracket 122 and the pawl is resiliently urged into locking engagement with a selected group of ratchet teeth 138 by a compression spring 144. Thus, by lowering the pawl 140 against the force of the spring 144, the pawl may be disengaged from the ratchet teeth 138, at which time the position of the knife 130 lengthwise of the bracket 122 may be adjusted by the engagement of a screw driver bit with notches 144 on the knife 130.

The rear of the knife 130 underlies a bottom surface 146 of the cap 132. A shoulder 148 is provided at the forward end of the surface 146 and a bottom surface 150 of the cap 132 extends forwardly of the shoulder 148 at a higher elevation than the surface 146 so that the surface 150 is spaced from the knife 130. A bedding tool 152 is seated against the shoulder 148 in the space between the surface 150 and the knife 130. A leaf spring 154 is secured to the cap 132 by a rivet 156 and underlies the rear of the bedding tool 152, and a pin 158 in the cap 132 is received in a hole in the bedding tool 152, thus securing the bedding tool in place between the surface 150 and the knife 130. The forward end of the bedding tool 152 is formed into a tapered nose 160 that is rearward of the knife edge 136. A pair of links 162 are pivoted on the pins 134 between the bracket 122 and the cap 132 and extend forwardly and divergently from the pins 134. The forward ends of the links 162 are received in cut-outs 164 in the wiper cams 104 and are pivoted to the wiper cams by pins 166.

The bracket 122, cap 132, knife 130 and bedding tool 152 constitute a bedding unit.

The knife 130 extends into slots 168 (FIGURE 13) provided in the adjoining surfaces of the wipers. The slots intersect the front side surfaces 118 and also intersect back side surfaces of the wipers that are described below. In the FIGURE 9 position, the knife edge 136 is located rearwardly of the vertex 120. The slots 168 are so constructed that their bottoms are below the bracket surface 131 and the knife is so constructed that its upper surface is below the tops of the slots 168.

Figure 9:
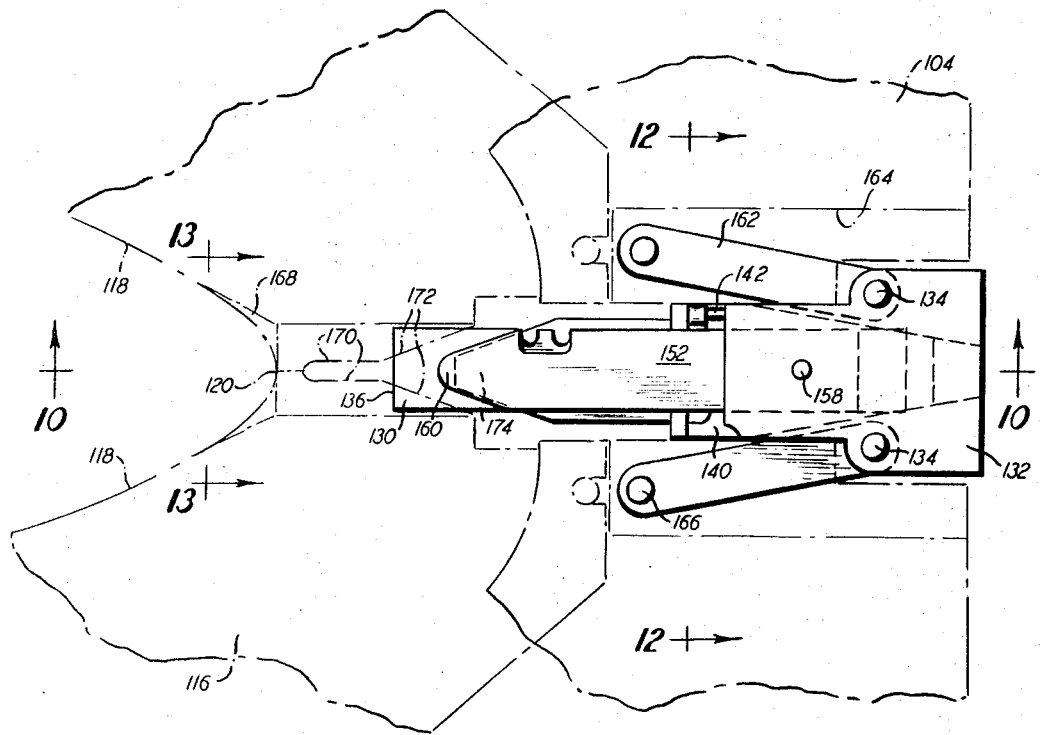
FIGURE 9 is a plan view of the wiping units and the bedding unit with the wiping unit shown in phantom.
Figure 10:
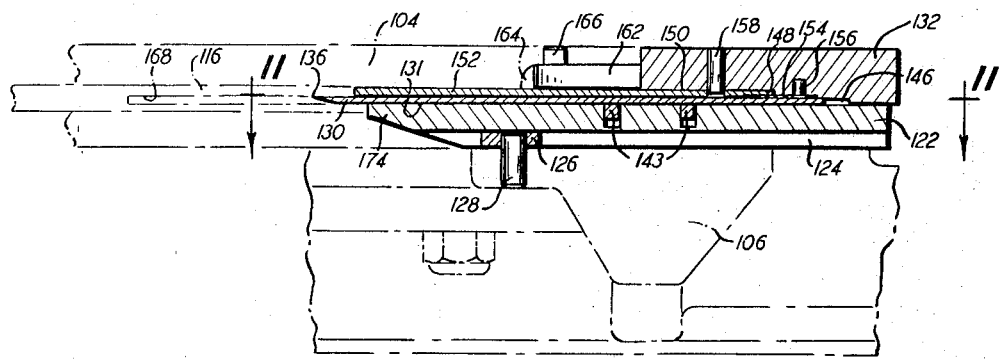
FIGURE 10 is a section taken on the line 10—10 of FIGURE 9.
Figure 11:
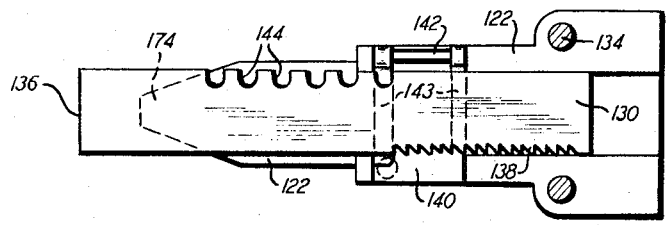
FIGURE 11 is a view taken on the line 11—11 of FIGURE 10.

As indicated in FIGURE 9, the wipers 106 have contiguous back side surfaces that extend rearwardly from the vertex 120. The back side surfaces include portions 170 that are spaced from each other and portions 172 that are rearward of the portions 170 and that diverge rearwardly when the wipers are in the FIGURE 9 position. The bedding tool 152 is so constructed that its upper surface is substantially coplanar with the upper surface of the wipers 116 and so that, in the FIGURE 9 position, its nose 160 is between the wiper portions 172. The bracket 122 has a nose 174 at its forward end that is spaced rearwardly of the knife edge 136 an amount sufficient to preclude interference between the nose 174 and the wipers 116.

A cover block 176 (FIGURES 1 and 2) is secured to the block 100 to overlie the wiper cams 104 and the cap 132.

The machine is designed to operate on a shoe assembly that comprises a shoe insole 178 located on the bottom of a last 180, preferably by being tacked thereto, and a shoe upper 182 draped over the last (see FIGURES 14 and 14A).

The shoe assembly is presented to the machine and the machine is caused to go through a portion of its cycle, as described in the aforementioned application Ser. No. 472,525 filed July 16, 1965, to bring the parts to the position shown in FIGURES 14 and 14A. At this time the shoe assembly is supported by the insole rests 40, 42 and the applicator-support 60 with the applicator-support 60 bearing against the periphery of the toe portion of the insole and the toe portion of the shoe assembly facing rearwardly toward the wipers 116. The piston rod 22 is projecting from the motor 16 and the piston rod 50 is projecting from the motor 48 so that the insole rests 40, 42 and the applicator-support 60 are in raised positions at a height such that the bottom of the toe portion of the insole 178 is above the level of the tops of the wipers 116 an amount that is approximately equal to the thickness of the margin of the upper 182. The toe portion of the upper 182 is stretched tightly about the last 180 with its margin extending downwardly of the insole and is pressed against the bottoms of the wipers 116 by a front retarder 184 and side retarders 186. Cement had been applied to the periphery of the toe portion of the insole 178 through holes 188 and a groove 190 (FIGURES 5 and 6) in the applicator-support 60, the piston rod 88 is projecting from the motor 84 under relatively light pressure to force the hold-down 80 against the top of the forepart of the shoe assembly under relatively light pressure, a heel clamp 192 is bearing against the heel portion of the shoe assembly, a yoke 194 (FIGURE 2) is bearing against the toe and forepart portions of the shoe assembly above the wipers 116, and bumpers 196 (FIGURE 2) are bearing against the forepart of the shoe assembly forwardly of the yoke 194. The plate 66 together with the wipers 106, knife 130 and bedding tool 152 are in a forward working position with the piston rod 92 retracted into the motor 90 so that the wipers are in the open position shown in FIGURE 9, the knife 130 is located in the slots 168 in such a position that its edge 136 is rearward of the wiper vertex 120, and the bedding tool 152 is located between the wiper portions 172.

Now the motor 90 is actuated to project its piston rod 94 forwardly. The forward projection of the piston rod 94, through the housing 96, block 100 and links 114, causes the wiper cams 104 and the wipers 116 carried thereby to move with respect to the block 106 in a wiping stroke with the pins 108 riding in the cam tracks 110 and 112 in a path determined by the configuration of the cam tracks. This configuration is such that the wipers have a component of forward translatory movement and an inward swinging movement about the vertex 120 to cause the wiper surfaces 118 to approach each other. This enables the wiper surfaces to cross under the shoe assembly to wipe or fold the toe portion of the margin of the upper 182 against the insole 178 and bond the margin to the insole by way of the cement that was applied to the insole.

Figure 15:
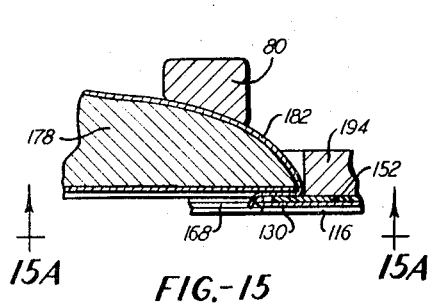
FIGURE 15 is a representation of the shoe assembly as it appears in the machine at the completion of the wiping stroke.
Figure 15A:
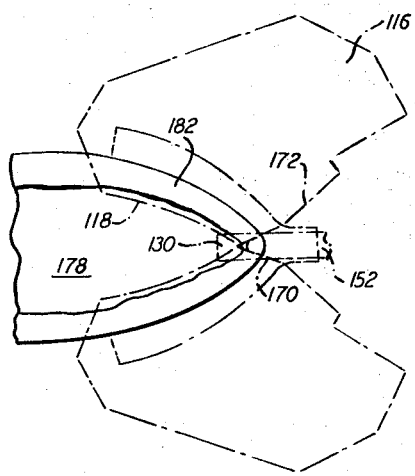
FIGURE 15A is a view taken on the line 15A—15A of FIGURE 15.

The inward swinging movement of the wiper cams 104 about the vertex 120 causes the links 162 to drag the bracket 122 and cap 132 together with the knife 130 and bedding tool 152 forwardly with respect to the wipers due to the pins 166 moving forwardly a lesser distance than the pins 134. During this forward movement, the bracket 122 moves along the top surface of the block 106 with the ring 126 riding in the slot 124. The forward movement of the knife 130 causes its edge 136 to be projected forwardly of the wiper surfaces 118 and cut into the pleated material gathered by the wipers at the toe end of the shoe by the inward movement of the wipers to thereby relieve the stresses caused by the formation of the pleated material (see FIGURES 15 and 15A). The forward movement of the bedding tool 152 causes it to substantially fill the gap created by the separation of the wiper portions 170 during the wiping stroke. At the completion of the wiping stroke the parts assume the position shown in FIGURES 15 and 15A.

During the wiping stroke the motor 48 is actuated to retract the piston rod 50 to thereby lower the applicator-support 60 out of the path of the oncoming wipers 116. After this the pressures applied by the front retarder 184 and the side retarders 186 is relieved, the timing being such that this takes place after the wipers have crossed under the insole and have started to wipe the upper margin against the insole so that the stretching of the upper about the last that had been maintained by the retarders is taken over by the wipers with the result that the stretching of the upper about the last is maintained during the wiping stroke. After this the motor 16 is actuated to lower the piston rod 22 and thereby lower the insole rests 40, 42 out of the path of the oncoming wipers 116 so that the shoe assembly is supported on its bottom solely by the wipers thus enabling the hold-down 80 to press the shoe assembly downwardly against the wipers and provide an overwiping pressure.

Figure 16:
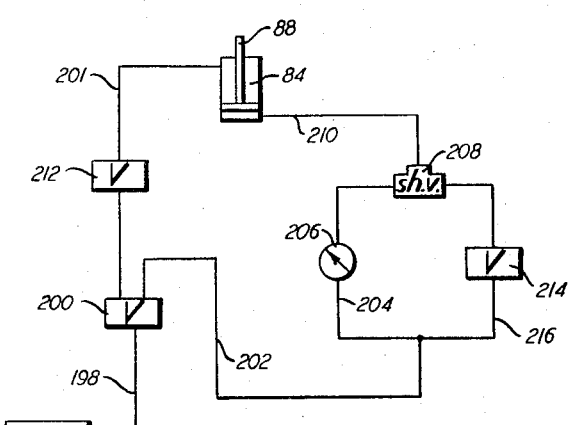
FIGURE 16 is a circuit diagram of a portion of the machine control.

In the idle condition of the machine, the hold-down 80 had been maintained in an upper position by the motor 88 by means of pressurized air that had passed from a source S (FIGURE 16) through a line 198, a valve 200 and a line 201 to the motor 84. Later in the machine cycle the hold-down had been forced against the shoe assembly under relatively light pressure into the FIGURE 14A position by the shifting of the valve 200 which had caused the pressurized air to pass from the valve 200 through a line 202, a line 204, a low pressure regulator 206, a shuttle valve 208 and a line 210 to the motor 84 to thereby raise the piston rod 88. Upon shifting the valve 200, the pressurized air that had previously passed to the motor 84 through the line 201 is exhausted to atmosphere by way of a quick exhaust valve 212 in the line 201. Towards the end of the wiping stroke and after the lowering of the insole rests 40, 42 a previously closed valve 214 is opened to enable pressurized air under full line pressure to pass from the line 202 through a line 216, the valve 214, the shuttle valve 208 and the line 210 to the motor 84 to force the hold-down 80 against the top of the forepart of the shoe assembly under a bedding pressure that is greater than had heretofore been provided by the pressurized air entering the shuttle valve 208 through the line 204. This bedding pressure is maintained for a predetermined length of time after the completion of the wiping stroke, after which the machine cycle is completed and the shoe assembly is released by the withdrawal of the machine parts from the shoe assembly.

The application of the bedding pressure serves to force the wiped upper margin against the wipers 116 to thereby flatten the wiped upper margin against the insole and to ensure that the upper margin is effectively bonded to the insole by the cement interposed between the upper margin and the insole. With the bedding tool 152 in the FIGURES 15 and 15A position at the completion of the wiping stroke, the bedding pressure is applied by the bedding tool to the toe end extremity of the wiped upper margin despite the gap formed between the wiper portions 170 during the wiping stroke. The resistance by the bedding tool to the application of the bedding pressure is borne by the knife 130, the bracket 122 and the block 106. There is therefore no appreciable downward deflection of the bedding tool 152 during the application of the bedding pressure. The horizontal distance between the forward end of the nose 174 of the bracket 122 and the forward end of the nose 160 of the bedding tool 152 is not great enough for the bedding tool nose 160 to deflect downwardly during the application of the bedding pressure.

The knife 130, for the foregoing reasons, will also not deflect downwardly during the application of the bedding pressure so that the bottom of the knife will remain spaced from the bottoms of the slots 168 in the wipers 116. Thus none of the bedding pressure is borne by the shoulders 218 (FIGURE 13) of the wipers that lie beneath the slots 168. This is advantageous since the relatively thin wiper shoulders 218 could be damaged if they had to bear the bedding pressure.

Figure 17:
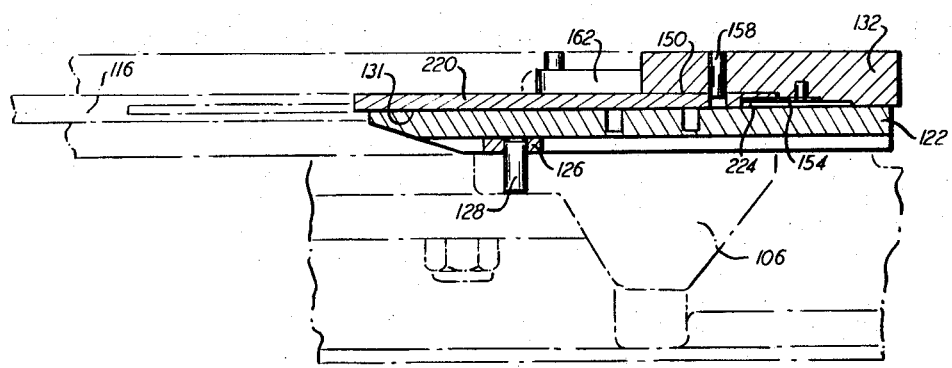
FIGURE 17 is a section showing an alternative form of bedding unit.

There are occasions in which it is not desired to use the knife 130 in conjunction with the bedding tool 152. In this event, the bedding unit shown in FIGURE 17, which omits the knife, is utilized. The ratchet 140, pin 142, links 143 and spring 144 are removed and a thicker bedding tool 220 is inserted between the surface 131 of the bracket 122 and the surface 150 of the cap 132. The bedding tool 220 has an undercut recess 224 which receives the leaf spring 154 and a hole to receive the pin 158. The bedding tool 220 is otherwise constructed the same as the bedding tool 152. In using the bedding tool 220, the machine functions in the manner described above except for the pleated upper margin material gathered by the wipers 116 not being cut. The resistance by the bedding tool 220 to the bedding pressure is borne by the bracket 122 and the block 106.

I claim:

1. A lasting machine for wiping a selected portion of the margin of an upper against the corresponding portion of an insole comprising: a support arrangement for supporting bottom-down a shoe assembly that comprises a last having an insole located on its bottom and an upper mounted thereon with the selected portion of the upper margin extending downwardly of the insole; a block; a pair of wiping units movably mounted on the block, said wiping units having front side surfaces that diverge forwardly from a vertex and back side surfaces that extend rearwardly of the vertex; means mounting the wiping units for movement through a wiping stroke from a retracted position wherein the wiping units are located rearwardly of said selected portions of the shoe assembly to an advanced position wherein the wiping units move forwardly, said front side surfaces swing inwardly about the vertex to wipe said margin portion against the insole and said back side surfaces separate to leave a gap therebetween that is beneath a segment of the wiped margin portion; a bedding unit, located between said back side surfaces, movably mounted on the block; cooperative guide means on the bedding unit and the block constraining the bedding unit for forward movement; means so connecting the bedding unit and the wiping units that in the retracted position of the wiping units the bedding unit is located rearwardly of said back side surfaces and that during the wiping stroke the bedding unit moves forwardly on the block at a greater rate than the wiping units into said gap in response to the swinging movement of the wiping units about said vertex to lie beneath said segment of the wiped margin portion when the wiping units are in their advanced position; and means for applying a downwardly directed bedding pressure by the shoe assembly against the wiping units and the bedding unit when the wiping units are in their advanced position that is borne by the block.

2. The machine as defined in claim 1 wherein the bedding unit has a lower surface and the block has an upper surface and said cooperative guide means comprises: a forwardly extending slot in one of said surfaces; and a follower member projecting from the other of said surfaces and slidably received in the slot.

3. The machine as defined in claim 1 wherein the means connecting the bedding unit and the wiping unit comprises: a pair of links; means pivotally connecting the links at their rear ends to the bedding unit; means pivotally connecting the forward end of each link to a separate wiping unit; and means so constructing and arranging the links and their pivotal connections that upon said swinging movement of the wiping units the forward ends of the links move forwardly a lesser distance than the rear ends of the links.

4. The machine as defined in claim 1 wherein each wiping unit comprises a wiper having a flat upper surface that intersects its associated front side surface; and the bedding unit comprises a bedding tool having an upper surface that is substantially coplanar with said upper surfaces of the wipers.

5. The machine as defined in claim 1 further comprising: means for lowering the support arrangement after the commencement of the wiping stroke so that the shoe assembly is supported solely by the wiping units and the bedding unit during the application of the bedding pressure.

6. A lasting machine for wiping a selected portion of the margin of an upper against the corresponding portion of an insole comprising: a support arrangement for supporting bottom-down a shoe assembly that comprises a last having an insole located on its bottom and an upper mounted thereon with the selected portion of the upper extending downwardly of the insole; a block; a pair of wiping units movably mounted on the block, each wiping unit including a wiper having a front side surface that diverges forwardly from a vertex, a back side surface that extends rearwardly of the vertex, an upper surface that intersects its associated front side surface, and a slot that intersects its associated front side surface and back side surface below its associated upper surface; means mounting the wiping units for movement through a wiping stroke from a retracted position wherein the wipers are located rearwardly of said selected portions of the shoe assembly to an advanced position wherein the wipers move forwardly, said front side surfaces swing inwardly about the vertex to wipe said margin portion against the insole and said back side surfaces separate to leave a gap therebetween that is beneath a segment of the wiped margin portion; a bedding unit, located between said back side surfaces, movably mounted on the block, the bedding unit including a knife having a forwardly directed cutting edge and a lower surface that is above the bottoms of the slots, and a bedding tool having a forwardly directed nose that is rearward of said cutting edge and an upper surface that is above said cutting edge; means constraining the bedding unit for forward movement on the block; means so constructing and arranging the bedding unit that in the retracted position of the wiping units the knife is received in the slots with its cutting edge located rearwardly of the vertex and the bedding tool nose is located rearwardly of said back side surfaces, and that during the wiping stroke the bedding unit moves forwardly on the block at a greater rate than the rate of forward movement of the wipers so that the knife moves forwardly in the slots with its cutting edge projected forwardly of the vertex to cut into upper material gathered by the wipers and the bedding tool nose moves into said gap to lie beneath said segment of the wiped margin portion when the wiping units are in their advanced position; and means for applying a downwardly directed bedding pressure by the shoe assembly against the wipers and the bedding tool when the wiping units are in their advanced position that is borne by the block.

7. The machine as defined in claim 6 wherein said upper surfaces of the wipers are flat and the bedding tool has an upper surface that is substantially coplanar with said upper surfaces of the wipers.

8. The machine as defined in claim 6 wherein: the bedding unit includes a bracket that is movable on the block; the bracket includes a forwardly directed nose; the knife is supported on the bracket with its cutting edge extending forwardly of the bracket nose; and the bedding tool is supported on the knife.

9. The machine as defined in claim 6 wherein the bedding unit has a lower surface and the block has an upper surface and the means constraining the bedding unit for forward movement on the block comprises: a forwardly extending slot in one of said surfaces; and a follower member projecting from the other of said surfaces and slidably received in the slot.

10. The machine as defined in claim 6 wherein said means for so constructing and arranging the bedding unit comprises: a pair of links; means pivotally connecting the links at their rear ends to the bedding unit; means pivotally connecting the forward end of each link to a wiping unit; and means so constructing and arranging the links and their pivotal connections that upon said swinging movement of the wipers the forward ends of the links move inwardly a lesser distance than the rear ends of the links.

11. The machine as defined in claim 6 further comprising: means for lowering the support arrangement after the commencement of the wiping stroke so that the shoe assembly is supported solely by the wipers and the bedding tool during the application of the bedding pressure.

References Cited

UNITED STATES PATENTS

| | | | |
|---|---|---|---|
| 2,596,169 | 5/1952 | Proulx et al. | 12—8.8 |
| 2,963,718 | 12/1960 | Jorgensen | 12—7.1 |
| 2,990,559 | 7/1961 | Gilbride | 12—12.4 |
| 3,061,852 | 11/1962 | Bray et al. | 12—7.1 |
| 3,189,924 | 6/1965 | Kamborian et al. | 12—8.8 |

PATRICK D. LAWSON, *Primary Examiner.*